Figure 1:
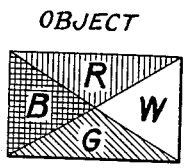

W. V. D. KELLEY.
COLOR PHOTOGRAPHY.
APPLICATION FILED FEB. 7, 1916.

1,278,161.

Patented Sept. 10, 1918.

OBJECT

RED NEGATIVE

GREEN NEGATIVE

PRINTING NEGATIVES

GREEN PRINTER

RED PRINTER

DYED GREEN

DYED RED

PROJECTING POSITIVE

INVENTOR
William V. D. Kelley,
BY
ATTORNEY.

UNITED STATES PATENT OFFICE.

WILLIAM V. D. KELLEY, OF BROOKLYN, NEW YORK, ASSIGNOR TO PRIZMA, INCORPORATED, A CORPORATION OF VIRGINIA.

COLOR PHOTOGRAPHY.

1,278,161.  Specification of Letters Patent.  Patented Sept. 10, 1918.

Application filed February 7, 1916. Serial No. 76,528.

*To all whom it may concern:*

Be it known that I, WILLIAM V. D KELLEY, a citizen of the United States, residing at Brooklyn, in the county of Kings and State of New York, have invented certain new and useful Improvements in Color Photography, of which the following is a full, clear, and exact specification.

This invention relates to color photography, and refers generally to a process for producing positives in natural color on either transparent or opaque supports. The positives produced on transparent supports are more especially intended for motion picture reproduction, but positives can be used as single pictures or transparencies, and the colors will also appear when the print is mounted on a suitable card or other opaque support.

The invention will be described herein with reference to its application to so called natural color cinematographic reproduction of scenes and objects by projection.

In what is known as the cinematographic process, a negative on panchromatic emulsion is first made by alternately exposing the object through complementary color screens, such for example as red and bluish green. One negative thus has color values corresponding to the red, and another negative has values corresponding to the green. Similar processes use more colors, but embody the same principle. A positive is then printed from this negative, with corresponding color values, and the positive is then projected in a machine equipped with a similar color screen to that used in taking. The double length of film required in this process is objectionable, as is also the necessity of special projecting apparatus, and also the relatively high speed of projection required, as compared with ordinary black and white pictures. Such pictures are also subject to the objection of color fringing, and do not always reproduce rapidly moving objects with fidelity. In order to save film, and also overcome the above disadvantages, as well as other practical disadvantages, it has been proposed to color each image in complementary colors, which when shown through an ordinary projector, at about the usual speed, would reproduce the natural colors.

This invention relates to the last named class, and has for its object to reduce the amount of film required, to simplify the previously known process, and to enable the work to be largely carried on in day-light, instead of being required to be done in the dark room as with the previous processes with which I am familiar. The processes in which the coloring of the images is required to be carried on in the dark room are very difficult and expensive to manage, because their accuracy and success depends upon an exact timing of one or more chemical treatments, and also because a too short or too long chemical treatment may entirely change the color, or destroy the work previously done. Moreover, in obtaining one color the other may be destroyed, and the operator in the dark room cannot always be certain that this has not happened until after the film has been examined in the light. It is therefore desirable that coloring by means of baths which vary the intensity of the deposited color according to the strength of the bath or time of treatment, be as far as possible eliminated. In all such previous processes with which I am familiar, at least one color has been obtained by the deposition or impregnation of the print with a metal, or metallic salt, as for example, Prussian blue.

According to this invention, I have devised a process in which each of the colors of the final positive is derived from a dye, which has the advantage as compared with previous processes of being workable in the light. Also the intensity of the coloring can be controlled by the dye bath in such a manner as not to be so completely subject to variations in the activity of chemicals, as in previous processes for this purpose.

Figure 2:
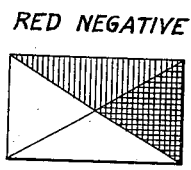
Figure 3:
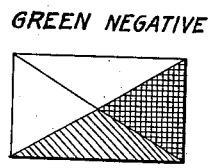
Figure 4:
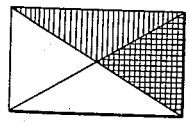
Figure 5:
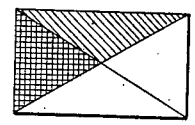
Figure 6:
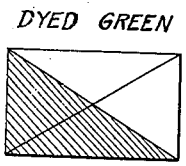
Figure 7:
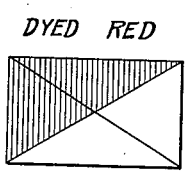
Figure 8:
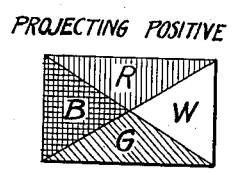

The accompanying drawing illustrates the various steps of the invention, in which, Figure 1 represents an image, Fig. 2 a red color value negative, Fig. 3 a green color value negative, Fig. 4 represents the green printer negative, Fig. 5 the red printer negative, Fig. 6 the green dyed positive image, Fig. 7 the red dyed positive image, and Fig. 8 represents the final projecting positive.

In carrying out the process, I take an original negative on panchromatic emulsion through color screens in the usual way, such for example, as complementary red and green, shown in Figs. 2 and 5. This negative will be taken about twice as fast, and require about twice the film, required by an ordinary black and white negative. From this negative a printing negative for one color, as red in Fig. 2 and a printing positive for the other color, as green in Fig. 5 are made, one of the reds only, and the other of the greens only. From these printing films, a projecting positive, as in Fig. 8, of one half the length of the original negative is made, in which the reds and greens are superposed, in the same gelatin stratum, but the positive is dyed so that the green portions appear green and the red portions red, the white portions white and the other portions in their proper color derived from the mixing of the complementary colors. As far as I am aware, a print in which the colors are both obtained by dyes, has not heretofore been produced. It will be seen that only one negative is required for a given subject, and any number of half length positives may be made from it. This negative may be made on a single strip film, having a succession of cycles of color value images, or the original negative may contain the color value images in pairs side by side on one film, or even on separate films. I have obtained satisfactory and novel results by making the negatives of standard panchromatic emulsions, the records being made in series of two or four color values. Where four color values are used, two colors correspond to the greens, and two to the reds, so that each pair of the four colors are complementary. The original negative need not necessarily be one composed solely of color values, but for the purposes of this invention must have at least some color values. If the dyeing colors are properly chosen, the colored as well as the monochromatic parts of the object will be properly reproduced. If four colors are used, each final pair, when colored, will be substantially complete as to color rendering.

The steps of this process may be summarized as follows:

| 1. | 2. | 3. |
|---|---|---|
| Original negative. | Printing negatives. | Projecting positive. |
| Red. Green. | Negative of reds only. Positive of greens only. | Print dyed green. Print dyed red. |

A new negative printer may be made from the original (if both the red and green are on one strip) having only the red values in unbroken succession, or the original negative may be used in all cases as printing negative for one of the colors and by suitable optical printing or similar means make the projecting positive. For the complementary color a positive print is used as the negative, this print having all of the images of like color value in unbroken succession.

The projecting positives are made on standard film stock coated on one side with silver bromid gelatin emulsion, both colors being impregnated into this one vehicle. The images of red values only, as in Fig. 2, are printed on the silver emulsion in the usual manner, giving less exposure than is customarily required for black and white positives. Developing follows so that the exposed silver image is converted into a gray silver image of the usual kind. The print should be soft—presenting a gray appearance. A developer such as rodinol is satisfactory. The formula used being 1 part rodinal to 30 parts water. Development will take place in 2 to 3 minutes, followed by the usual bath in hyposulfite of soda and washing. This is then placed in a bath of chlorid of copper, 5% solution. Then the film is washed in running water, and then into potassium iodid 1% solution. The image at this stage has now been converted into iodid of silver. Iodid of silver being opaque, the silver is removed by the hyposulfite bath without disturbing the color, so that there is left an exact and delicate image in color only in the gelatin stratum. The whites may be cleared, if stained, by washing in water containing acetic acid. Then wash; then dye in a preferably basic dye, which may be green, giving the print shown in Fig. 6. A suitable proportion is 2 grains of dye to 6 ounces of water. This thin print allows of quick dyeing, and the color is of relatively thin depth and body. It is now washed to clear the whites.

The positive strip now having images in green dye is placed for about five minutes in the following bath:

Ammonium bichromate_ 5 grams
Water_____200 c. c. s.

Then dried and exposed to the red printing positive of Fig. 5 (positive of greens) for about one minute by artificial light. Then washed in cold water to eliminate the bichromate.

Then dyed in a pinatype red or other acid dye, which attacks the unexposed gelatin in proportion to the exposure and does not attack the exposed gelatin, giving the print of Fig. 7.

Water _____ 100 c. c. s.
Dye _____ 3 to 4 grams.

This is a stock solution, which is diluted with 100 c. c. s., more or less according to the result desired.

The proportion of pinatype dye to water depends on the dye used, formulas for which may be found in a book on the pinatype process published by the Farbwerke-Hoechst Co., New York. The dyes are fixed in any suitable material such as pinatype fixature, after which the silver remaining in the gelatin is dissolved out by means of hyposulfite of soda. This leaves the dyes alone in the gelatin surface, as in Fig. 8.

The pinatype dye has the property of attacking soft gelatin which has not been affected by light owing to being covered by the dark portions of the printer positive, and it does not attack those portions of the gelatin which have become relatively hard owing to having been exposed to light through the open portions of the printer positive. If it is desired to dye parts that are normally open in the original negative, a printer positive must be made from the original negative so that the parts which are to be colored will be black, thereby protecting the gelatin and keeping it soft so that it will take the dye only in such soft portions.

The basic dye used to color the silver image, deposits color in proportion to the amount of exposed silver present. The dyeing is done in a weak solution of dye until the dye has penetrated through and shows as strong as on the face side.

By this process, all of the dyeing or staining operations are conducted in white light, a very necessary requirement where working with colors.

Inasmuch as dyes are a known quantity, and the coloring process can be carried on in ordinary light, the coloring is very easily controlled and uniform results are easily obtainable. A suitable combination of colors for the dyes, is as follows: for the basic dye, malachite green in combination with pinatype complementary red D.

The superposed image must be in register so that records of the greenness (dyed red) and that of the redness (dyed green) are as one in the coating on the support. The dyes used should be as near complementary as is possible, so where the same amount is present in both of the registered images, an absence of color is the result at that point.

As any single image will be substantially in natural colors, it is obvious that the method disclosed is suitable for plates or paper. The process is especially suitable for plates or paper coated with gelatin bromid emulsion, and prints, transparencies, and the like can be obtained in natural colors.

Where four colors are used in taking, such that each pair makes up approximately white, but each pair making records of different positions in the spectrum, then in the positive the blue-reds and red-orange records will be in unbroken sequence and the yellow-greens and green-blue likewise. Each finished heliochrome will be satisfactory in color rendering, but adjacent records will vary slightly and the averaging and correcting of the colors will occur from the projecting in rapid succession. Either pair of colors, such as blue-reds for one image and yellow-greens for the other may be used for a complete picture on the two color basis. Or they may be any pair of colors or mixtures, which will divide the spectrum colors into two parts photographically so as to reproduce the original colors again, and so as to meet the requirements of the dyes used.

If four colors are used in making the negative and the rendering is correct as to color values in the film, then no considerable benefit results from using four different colors when projecting, as two properly chosen colors used in conjunction with the four color film record will produce all the colors with all of the fidelity that the four projecting colors will. Consequently, only two dye colors are necessary with either the two or four color negative records.

In the description of the two color process given, I have given the silver image as being dyed green but I may use a basic red dye for one image and a green pinatype or other acid dye for the other record of the pair of images.

In carrying out this process, the colors can be applied simultaneously from a bath made up of the two colors, because the pinatype will not affect one color and the other color will not affect the parts which the pinatype dye affects. So far as I am aware, previous processes have required separate baths because one color has always been a metal precipitate or deposit, which could not be imparted to the print at the same time with the dye and the process of this invention constitutes in this respect a distinct departure from previously known processes.

A further use for this process is the production of stereoscopic images which may be made from a series of such images and in which each pair is made up of blended complementary colors (one color for each image) in one surface in predetermined registered relation and the result viewed with spectacles colored with one complementary color for each eye. The eye looking through the green glass sees only the red, which appears black, and the other eye looking through the red glass, sees only the green image which appears black, so that each eye sees only the image intended for it and the blending of the two images by means of two eyes, causes the images to appear in black and white and in relief.

The final positives obtained by this process are of substantially uniform smoothness, owing to the fact that the original gelatin coating and collodion support are retained, instead of being partly destroyed, as in previous processes. In some cases, with previous processes, even the collodion support is partly removed in order to obtain the color. All such effects are objectionable, because the film is weakened, or rough, and does not work well in the projecting machine. By the process of this invention, such objections are avoided because the final positive, whether in registry, as in motion picture work, or side by side, as in stereoscopic work, are both dyed in the same stratum of the original emulsion. A smooth image of high durability is thus obtained.

Having thus described my invention, I declare that what I claim as new and desire to secure by Letters Patent, is:—

1. A process for producing a transparency having in a single coating two images composed of different dye colors, consisting in printing in said coating an image having values recording one dye color, treating said image in such manner as to convert it into pure dye of the other color, printing in the same coating in predetermined registry with the first image a second image having values recording the other dye color, and finally treating said second image in such manner as to convert it into pure dye of the remaining color.

2. A process for producing a transparency having in a single coating two images composed of different dye colors, consisting in printing in said coating an image having values recording one dye color, treating said image in such manner as to convert it into pure dye of the other color, resensitizing the coating to render it capable of being hardened by light, printing in the resensitized coating in predetermined registry with the first image a second image having valves recording the other dye color so as to harden the coating in proportion to the light passed by said second image, and finally treating said second image formed in the unhardened coating in such manner as to convert it into pure dye of the remaining color.

3. A photographic process in which two coöperating transparent images having different colors are formed in the original coating of the support, one image being printed in the silver of the coating from a printing image containing values corresponding to one color and then dyed with the other color by a dye absorbed by the coating in proportion to the silver present, and the silver then removed, and the other colored image being made from a second printing image containing values corresponding to the other color and then dyed with the remaining color by the selective action of the carrier to dye when hardened by the light transmitted through said second printing image.

4. A photographic process in which two transparent images having complementary colors are formed in registry in the original coating of the support, one image being printed from a printing image containing values corresponding to one color and then dyed with the complementary color, and the other image being made from a second printing image containing values corresponding to the other color and then dyed with a dye by the selective action of the coating to dye when hardened by the light transmitted through said second printing image.

5. A photographic process in which two transparent images having complementary colors are formed in registry in the original coating of the support, one image being printed in the silver of the coating from a printing image containing values corresponding to one color and then dyed with the complementary color by dye absorbed by the coating in proportion to the silver present, and the silver then removed, and the other image being made from a second printing image containing values corresponding to the other color and then dyed with a dye complementary to the first dye by the selective action of the coating to dye when hardened by the light transmitted through said second printing image.

6. A photographic transparency comprising a coating capable of being dyed and also of being hardened by light, having dyed registering images in different colors, one image being dyed in said coating through the agency of a temporary metallic deposit thereafter removed, and the other image being dyed in the same coating through its capacity of being hardened by light.

7. A photographic process involving the production of a negative of two images from one of which certain color sensations have been omitted and from the other of which certain other complementary color sensations have been omitted, imprinting one of said images upon sensitized coating, coloring said image by a dye of color complementary to the color recorded thereby, removing the light affected constituent, resensitizing by means of bichromate, imprinting the other of said images in the same coating in predetermined registry with the first image by the hardening action of light, removing the bichromate, and coloring the second image by a complementary dye so as to produce a composite image therein composed of pure dyes.

8. The process of producing color prints which consists in recording color value negatives on panchromatic emulsion through complementary color filters, forming a projecting positive in a sensitive emulsion by printing in registry one of said negatives and a positive of the other, and dyeing the prints in said latter emulsion with respectively complementary dyes corresponding to the color filters.

9. The process of producing color prints which consists in recording color value negatives on panchromatic emulsion through complementary color filters, forming a projecting positive in a sensitive emulsion by printing one of said negatives, resensitizing and printing in registry a positive of the other negative, selectively dyeing said emulsion with complementary colors corresponding to the color filters, and removing the sensitizing constituents of the emulsion so as to produce a composite image therein composed of pure dyes.

10. A photographic color record having a single coating carrying two colored images printed therein in predetermined registered relation, said images consisting of completely transparent pure dye colors absorbed by immersion in dye baths after the coating is rendered selective to dye by the printing, and being free of the printing sensitizing agents.

11. A photographic color record including a single coating having two colored images, one image being dyed therein by the absorptive action of a light sensitive agent in the coating, and the other image being registered in predetermined relation to the first image and dyed in the coating after it is resensitized, said record being free of sensitizing agents and the images being composed of pure dye colors.

12. A photographic color record in which complementary color images are dyed in the original coating of the support, one being dyed therein by the absorptive action of a light sensitive constituent of the coating which is thereafter removed and leaving the dye in the coating, and another image in registry dyed in the coating by the selective action of the coating to dye due to the hardening action of light thereon.

In testimony whereof I affix my signature.

WILLIAM V. D. KELLEY.